Nov. 17, 1931.  C. H. DESAUTELS  1,832,478
TIRE FORMER AND CHUCK
Filed May 19, 1928  2 Sheets-Sheet 1

INVENTOR.
CHARLES H. DESAUTELS.
BY
ATTORNEY.

Nov. 17, 1931.            C. H. DESAUTELS            1,832,478
                        TIRE FORMER AND CHUCK
                         Filed May 19, 1928            2 Sheets-Sheet 2

INVENTOR.
CHARLES H. DESAUTELS.
BY
ATTORNEY.

Patented Nov. 17, 1931

1,832,478

UNITED STATES PATENT OFFICE

CHARLES H. DESAUTELS, OF SPRINGFIELD, MASSACHUSETTS, ASSIGNOR TO THE FISK RUBBER COMPANY, OF CHICOPEE FALLS, MASSACHUSETTS, A CORPORATION OF MASSACHUSETTS

TIRE FORMER AND CHUCK

Application filed May 19, 1928. Serial No. 278,927.

My invention relates to collapsible tire building formers and chucks and has for one of its objects the provision of a chuck of simple construction which will collapse the former to dimensions permitting easy removal of the tire casing built thereon. Another object is to provide certain improvements in the chuck disclosed in the application for Tire formers and chucks, filed by Paul W. Lehman, Serial No. 243,837, filed December 31, 1927. In the Lehman chuck gravity is used to help collapse and also to expand the chuck, there being certain positions in which the chuck must be held when these operations are performed. A chuck made in accordance with my invention may be collapsed in any position and then, without changing its position, be again closed. Other and further objects will be apparent from the following specification and claims.

In the accompanying drawings which illustrate one embodiment of my invention,

Figure 1:
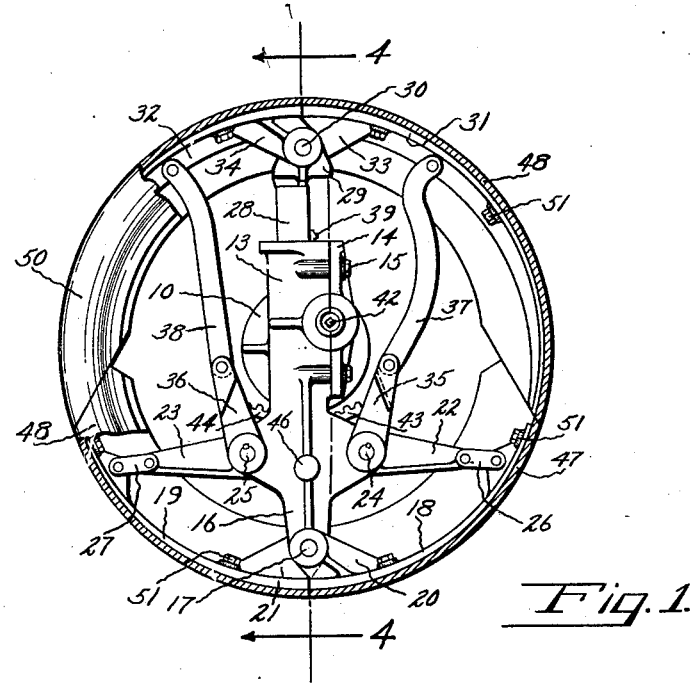
Fig. 1 is a side elevation of the tire former and chuck with parts broken away, the former and chuck being in expanded position.

While in ordinary practice the Lehman type of chuck has proved quite successful, it has not been entirely satisfactory in its operation especially in regard to the speed and safety of its operation. This chuck may be collapsed only when gravity is brought to act on the two freely pivoted segments and, to expand it again into tire building form it needs a partial rotation so that gravity may again be used, this time to bring the freely pivoted segments into expanded position. Then too, the freely pivoted segments may, if the chuck is rotated by accidentally starting the chuck rotating means, injure the operator if he is standing near the machine. My type of chuck will completely overcome these objectionable features.

In the drawings, a support 10 for the chuck is secured as at 11 to the end of a shaft 12 driven by any suitable power unit. The support 10 comprises a channeled body portion 13 provided with a cover plate 14 secured to the body as by screws 15 and is formed with projecting spaced arms 16. A shaft 17 is carried in the ends of the arms 16 upon which are pivoted two former supporting segments 18 and 19 by means of bearings formed in lugs 20 and 21 respectively secured to or made integral with segments 18 and 19. Two arms 22 and 23 are keyed to shafts 24 and 25 which are pivoted in the arms 16, the arms 22 and 23 being respectively connected to segments 18 and 19 by links 26 and 27.

In the channeled portion 13 of support 10 is slidably mounted a channel member 28 provided at its end with arms 29 in which are carried a shaft 30 upon which are pivoted two former supporting segments 31 and 32 by means of bearings formed in lugs 33 and 34 secured to or made integral with segments 31 and 32. Two arms 35 and 36 also keyed to shafts 24 and 25 are respectively connected to the segments 31 and 32 by links 37 and 38.

Figure 5:
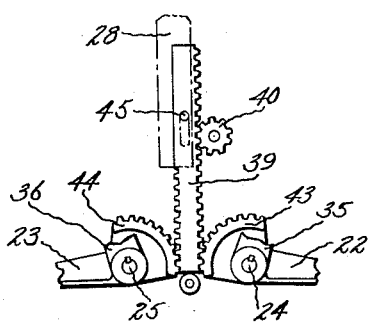
Fig. 5 is a detail of the operating pinion rack and gear segments showing the parts in the position they occupy when the chuck is expanded.
Figure 6:
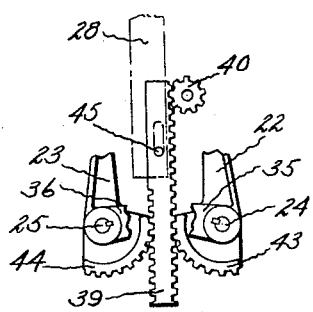
Fig. 6 is a similar view but with the parts in the contracted position.

The shafts 24 and 25 to which the arms 22, 23, 35, and 36 are keyed, are rotated by a rack 39 slidable within the member 28 and actuated by a pinion 40 on a shaft 41 journaled in bearings in the support 13, said shaft having a squared end 42 adapted to receive a socket wrench by which the pinion may be rotated. The rack 39 meshes with a pair of gear segments 43 and 44 provided on the arms 22 and 23. The member 28 is adapted to be reciprocated within the support 13 as the linkage, provided by the arms 35 and 36 and links 37 and 38, is actuated. A stop pin 45 (see Figs. 5 and 6) fixed in the rack 39 and sliding in a lost motion slot in the member 28, limits the outward movement of the member 28.

Figure 4:
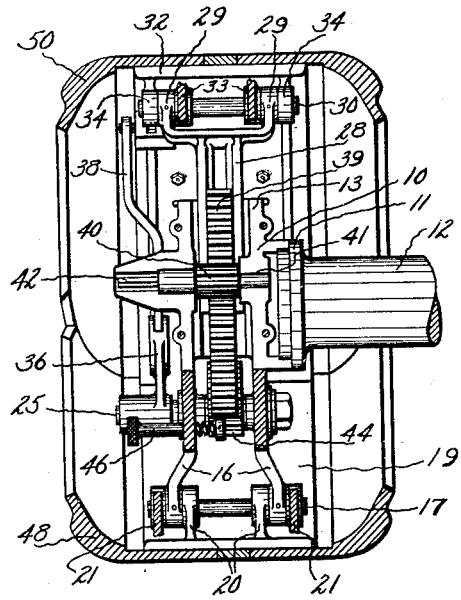
Fig. 4 is a view taken substantially on line 4—4 of Fig. 1.

The rack is adapted to be locked in the outer position by means of a spring-pressed pin 46 slidably mounted in the support 16 and adapted to project beneath the end of the rack as shown in Fig. 4. Segments 18, 19, 31, and 32 normally form a complete annulus and are adapted to respectively support former segments 47, 48, 49, and 50 which are releasably secured to the supporting segments by means of bolts 51. Different types and shapes of formers may therefore be substituted without disturbing any of the chuck parts or removing the chuck from shaft 12.

Figure 2:
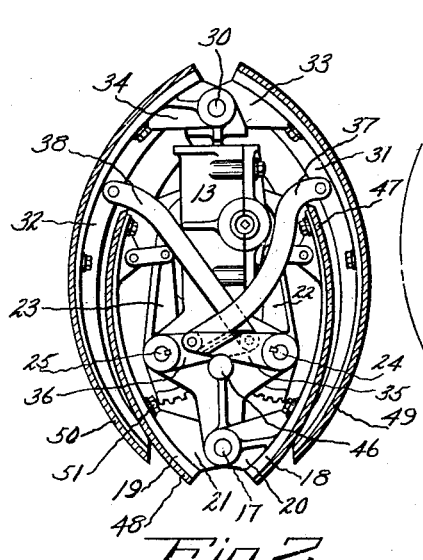
Fig. 2 is a view similar to that of Fig. 1, but showing the former and chuck in collapsed position.
Figure 3:
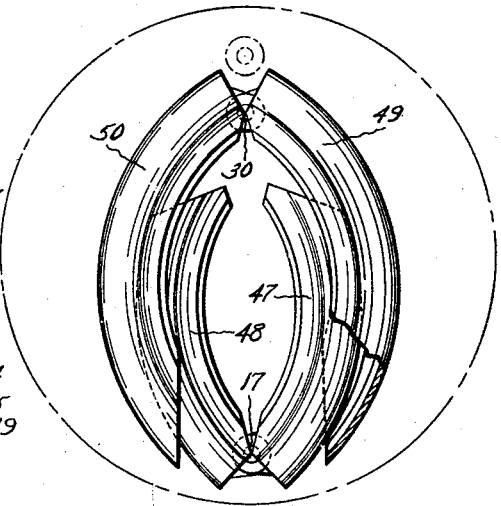
Fig. 3 is a detail view showing the collapsed former and its points of attachment to the chuck in comparison with its expanded circumference.

The operation of the chuck will now be described. With the parts in the expanded position shown in Figs. 1 and 4, pin 46 is withdrawn, a socket wrench applied to the square end 42 of shaft 41 to rotate the pinion 40 and move the rack 39 past the withdrawn pin. Advance of the rack will cause the four segments 18, 19, 31, and 32 together with their respective former segments to positively move into the comparatively small space as shown in Fig. 2, the member 28 sliding into the support 13 as the segments 31 and 32 are drawn in by the links 37 and 38 and arms 35 and 36. The expanding of the chuck is also positive as the latter links and arms will simultaneously raise the pivot point 30 to its extreme position away from the support 13 and open the segments 31 and 32 while the arms 22 and 23 will open the segments 18 and 19. It will be understood that although the support is shown in the drawings in an upright position, the opening and closing action of the chuck is identically the same no matter in whatever position it is operated.

The construction of my improved chuck will, if desired, allow it to be brought into expanded position from collapsed position by rotating the support. Since slapping of the individual segments is avoided by the segment operating means which causes all the segments to move if one moves, the action of centrifugal force will cause all the segments to move gradually away from the support simultaneously. In no other collapsible chuck, in the applicant's knowledge, can centrifugal force be used with safety to expand the chuck.

Having thus described my invention, I claim:

1. A collapsible tire former comprising a support consisting of a body portion and a member slidable therein, a pair of former segments pivoted at one end of the body portion, a pair of former segments pivoted to the free end of the sliding member, a rack reciprocably mounted in the support, a pinion for driving the rack, a pair of gear segments pivoted to the support and meshing with the rack, two pair of arms keyed to shaft common to the gear segments and the arms, a link on each of said arms connected to pivots on the former segments, and a stop pin adapted to limit the movement of the sliding member.

2. A collapsible tire former comprising a rotatable support, a pair of former supporting segments pivoted at one end of the support, a second pair of former supporting segments pivoted at the opposite end of the support, toggle connections between each former supporting segment and the support and means to actuate said toggle connections.

3. A collapsible tire former comprising a rotatable support, a pair of former segments pivoted at one end of the support, a second pair of former supporting segments pivoted at the opposite end of the support, toggle connections between each former segment and the support and means carried by the support operable to actuate said toggle connections and to move the pivot of the second pair of former segments toward or from the second mentioned pivot subsequent to the initial movement of the toggles.

4. A collapsible tire former comprising a rotatable support consisting of a body portion and a member slidable therein, a pair of former segments pivoted at one end of the body portion, a pair of former segments pivoted to the free end of the sliding member, toggle connections between each former segment and the body portion of the support and means carried by said body portion to actuate the toggles and to reciprocate the sliding member in the body portion of the support.

5. A collapsible tire former comprising a rotatable support contractible in the plane of the former, two former segments pivoted to one end of the support, two former segments pivoted to the other end of the support, toggle connections between each former segment and the support and means carried by the support to actuate the toggles and to contract and expand the support.

CHARLES H. DESAUTELS.